United States Patent
Letzas et al.

(10) Patent No.: US 9,045,158 B2
(45) Date of Patent: Jun. 2, 2015

(54) DEFORMABLE HEATING ELEMENT

(75) Inventors: Volker Letzas, Muenster (DE); Sven Debes, Muenster (DE)

(73) Assignee: I. G. BAUERHIN GMBH, Gruendau (DE)

( * ) Notice: Subject to any disclaimer, the term of this patent is extended or adjusted under 35 U.S.C. 154(b) by 233 days.

(21) Appl. No.: 12/877,176

(22) Filed: Sep. 8, 2010

(65) Prior Publication Data

US 2011/0056930 A1 Mar. 10, 2011

(30) Foreign Application Priority Data

Sep. 8, 2009 (DE) .................... 20 2009 012 162 U

(51) Int. Cl.
*H05B 3/02* (2006.01)
*B62D 1/06* (2006.01)
*H05B 3/34* (2006.01)

(52) U.S. Cl.
CPC ........ *B62D 1/065* (2013.01); *H05B 3/34* (2013.01); *H05B 2203/014* (2013.01); *H05B 2203/017* (2013.01)

(58) Field of Classification Search
CPC ............. B62D 1/065; H05B 2203/014; H05B 2203/017
USPC .................. 219/203, 204, 528, 544, 546; 428/423.4; 74/552, 538
See application file for complete search history.

(56) References Cited

U.S. PATENT DOCUMENTS

| | | | | |
|---|---|---|---|---|
| 6,378,948 B1 * | 4/2002 | Macher et al. | ........... | 297/452.28 |
| 2010/0038356 A1 * | 2/2010 | Fukuda et al. | ................ | 219/549 |

FOREIGN PATENT DOCUMENTS

| | | | |
|---|---|---|---|
| DE | 102006004145 A1 | | 1/2006 |
| EP | 0832806 A1 | | 8/1987 |
| EP | 0235798 | * | 9/1987 |

* cited by examiner

*Primary Examiner* — Dana Ross
*Assistant Examiner* — Joseph Iskra
(74) *Attorney, Agent, or Firm* — Karl F. Milde, Jr.; Eckert Seamans Cherin & Mellott, LLC

(57) ABSTRACT

A deformable heating element for a steering wheel comprises at least one heating conductor, one side of which is laid on, and fastened to, a front-side layer of a flat base material. The base material, in area of the front-side layer on which the heating conductor is laid and fastened, has a lower compression hardness and/or a volume density than does this base material in the area of its opposite, rear-side layer.

16 Claims, 1 Drawing Sheet

DEFORMABLE HEATING ELEMENT

BACKGROUND OF THE INVENTION

The present invention relates to a deformable heating element, particularly for heating the steering wheel of a motor vehicle.

To heat steering wheels, heating elements are needed that fit the cross-sectional shape of the steering wheel rim. Known heating elements for steering wheels consist of a flat base material that comprises metallic heating conductors on one side thereof. Steering wheel heaters are also known wherein the heating elements are embedded into foam material or into a thermoplastic. Heating elements made of textile layers and/or foam materials between which the heating conductor is inserted are also known.

DE 296 16 918 U1 describes a steering wheel with an integrated steering wheel heater. In this steering wheel heater the heating conductor is fused into a thermoplastic material. The fusion process takes place after a voltage has been applied to the heating conductor. In this process the heating conductor penetrates into the thermoplastic material to such an extent that the heating conductor is flush with the thermoplastic on the outside. With this embodiment of the heating conductor in the thermoplastic material, the heating wire does not become apparent or emerge on the outside of the outer cover and can also not be sensed or felt while the steering wheel is held.

EP 0 832 806 A1 describes a steering wheel with an integrated steering wheel heater. The steering wheel rim of the steering wheel is provided under its outer cover with a layer of thermoplastic material into which the heating wire is fused. In this embodiment, the heating wire can be flush with the layer of thermoplastic material on the outside or it can be fully coated with thermoplastic material.

DE 10 2006 004 145 A1 refers to an electric heating element. The heating element comprises a support, which may be made from any desired material, e.g. a textile fabric, a nonwoven, a film, a woven fabric, a knitted fabric, formed from synthetic or natural fiber material. The support is provided at least locally with an at least temporarily adhesive material exhibiting adhesiveness that can be activated in a selective way. The heating conductor is sewn to the support.

The above-mentioned heaters, in which the heating conductor is heated for manufacturing reasons to either activate an adhesive or to fuse the adhesive into a foam body, have the drawback that the heating conductors are already stressed to a very great degree during manufacture due to the heating to very high temperatures within a very short period of time so as to activate the materials and to be able to carry out the manufacturing process within very short cycle times. Furthermore, it may happen that the heating conductor becomes apparent or can be seen on the steering wheel cover.

SUMMARY OF THE INVENTION

It is a principal object of the present invention to provide a deformable heating element which can be produced at low cost, in which the heating conductor cannot be seen or felt in a steering wheel cover in the installed state, and in which the heating conductor need not be loaded thermally during the manufacturing process.

This object, as well as further objects which will become apparent from the discussion that follows, are achieved, in accordance with the present invention, by providing a heating element which comprises at least one heating conductor that is laid on, and fastened to, a flat base material at one side thereof, called front-side layer, and wherein the base material, in the area of the front-side layer on which the heating conductor is laid and fastened, has a lower compression hardness and/or volume density than the base material in the area of the opposite rear-side layer.

The special advantage of this heating element is due to the fact that the structure of the base material is subdivided into two different layers, namely one that forms the front side, which means the side on which the heating conductor is placed or embedded, and a layer that forms the rear side of the base material.

In the deformable heating element according to the invention, the rear side of the base material has a compression hardness and/or volume density that is higher than that of the layer of the base material forming the front side. The rear-side layer is suited to form the connection area and thus the adhesive area with the steering wheel body or the cover, depending on whether the heating conductor, positioned in the area of the front-side layer is to be arranged closer to the steering wheel body or closer to the cover. It can be ensured with the high compression hardness and/or volume density that the adhesive with which the deformable heating element is fastened to the support body penetrates into that layer only to a small extent if at all. By contrast, the front-side layer is loosened such that a heating conductor which is applied thereto can be inserted into the loosened material. This ensures that a heating conductor cannot be seen or felt in the cover material of the steering wheel. It is here also possible to adapt the properties of the respective layer to the requirements by varying the compression hardness and/or the volume density of the front-side layer relative to the rear-side layer.

Owing to its structure, the heating element according to the invention is also characterized by its high deformability, so that it can also be placed on strongly curved areas, such as e.g. a steering wheel rim.

As for the compression hardness, this hardness is defined as the pressure that has to be applied to press in a raw block of foam by 40%. The lower the compression hardness, the softer is the material.

If heating conductors are used that have a rather thick conductor diameter, the compression hardness and/or volume density of the front-side layer should be kept very low so as to embed the cross-section of the heating conductor in this material layer. It has been found in the case of a low compression hardness and/or volume density of the front-side layer that when the heating conductor has been placed on the layer, and pressed into the layer, the loose material will come to rest on the heating conductor and not only embed the conductor but also cover the same.

In a preferred embodiment, the entire base material, i.e. both the material of the front-side layer and the material of the rear-side layer, are made from the same type of material. This can considerably simplify the manufacturing process of the heating element.

The base material should have a volume weight ranging from $50 \text{ kg/m}^3$ to $200 \text{ kg/m}^3$, preferably from $50 \text{ kg/m}^3$ to $100 \text{ kg/m}^3$. The front-side layer and the rear-side layer are set within these ranges.

The base material preferably has a material thickness ranging from 1.0 mm to 3 mm, and particularly between 1 mm and 2 mm.

At a thickness of 1 mm to 2 mm the base material should have a basis or surface weight of $50\text{-}150 \text{ g/m}^2$.

Good results are achieved when the front-side layer occupies a volume 50% to 100% larger than that occupied by the rear-side layer at the same volume weight. It is particularly with such a base material that a heating conductor placed thereon cannot be seen under the cover positioned thereabove in the installed state of the heating element.

The base material is formed at least on the front-side layer from a needle punched nonwoven as the particularly preferred material. Cellular rubber or a wool-cotton mixture is just as well suited. A needle punched nonwoven should be used whenever the steering wheel cover has a coarse structure (not smooth leather). Optionally, the leather cover may include a lamination in the form of cellular rubber. Cellular rubber is suited for both smooth leather and coarsely structured leather. Due to the leather tension caused by covering the steering wheel with leather, the heating conductor presses into the cellular rubber and the heating conductor can thus not be seen on the leather cover. A wool-cotton mixture should be used whenever the heating conductor is particularly thick in diameter (0.12 mm-0.15 mm) or exhibits an excessive erecting force in terms of stiffness. Stiffness stands for the stranding of the heating conductor.

This is also true when the base material is made from a material with elastic fibers. A material made of elastic fibers—e.g., polyester fibers—should be used when an elasticity of the steering wheel heater between 8-15 percent (%) of the original state is required.

It may be advantageous, for a defined setting of the compression hardness and/or volume density between the front-side layer and the rear-side layer of the base material, that these two layers are formed from at least two superposed mats, preferably mats of needle-punched nonwoven.

The rear-side layer of the base material, which is strengthened in comparison with the front-side layer, may be made from a thin knitted fabric. Such a knitted fabric forms a base for the front-side layer.

To enable the heating conductor to fit optimally into the front-side layer of the base material, it is of advantage when a heating conductor is used that is built up of a plurality of strands. When the heating conductor is pressed into the top-side layer, the strands of the heating conductor will conform to the structure of the base material. Heating conductors having 4-10 strands, with each strand having a diameter of from 0.06 mm to 0.15 mm, are preferably used.

The base material can be built up such that the compression hardness is monotonically increasing from the front side to the rear side. Particularly preferably, the compression hardness should show a linear or quadratic rise from the front side to the rear side.

The heating conductors can consist of a plurality of filaments, the individual filaments being covered with a coat of lacquer.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
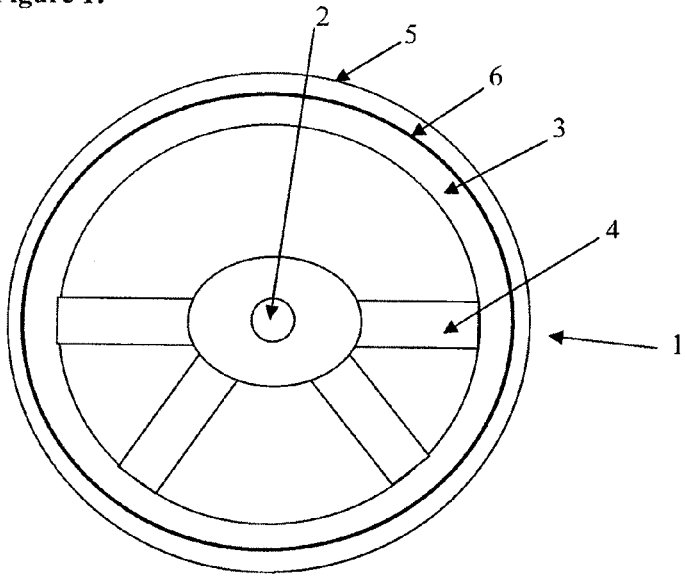
FIG. 1 is a representational diagram of a steering wheel with heating element.

The preferred embodiments of the present invention will now be described with reference to FIGS. 1-4 of the drawings. Identical elements in the various figures are designated with the same reference numerals.

The steering wheel, as shown in FIG. 1 in a top view, which is generally designated with reference numeral 1, comprises a steering wheel hub 2 and a steering wheel body 3, also called steering wheel rim, which is held on the steering wheel hub 2 by means of spokes 4.

The steering wheel body 3 is covered with a steering wheel cover 5. A heating element for heating the steering wheel rim 3 is positioned underneath the steering wheel cover 5. The heating element is designated with reference numeral 6.

In such electrically heated steering wheels, the steering wheel cover 5 is normally made from leather which stands out for its material-specific properties when heated.

Figure 2:
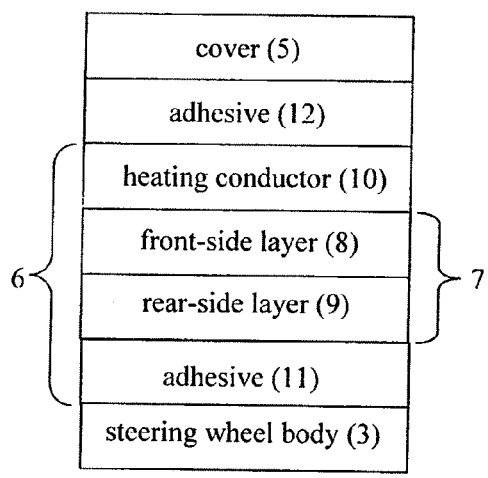
FIG. 2 is a representational diagram of the cross-sectional structure of the steering wheel according to FIG. 1, from the steering wheel body to the steering wheel, the heating conductor being oriented towards the cover.
Figure 3:
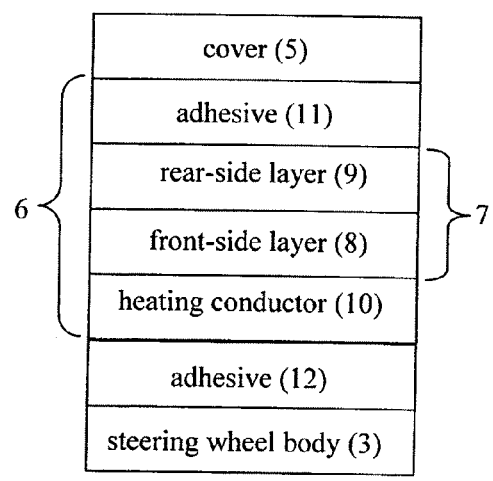
FIG. 3 is a representational diagram of the cross-sectional structure of the steering wheel according to FIG. 1, from the steering wheel body to the steering wheel, the heating conductor being oriented towards the steering wheel body.
Figure 4:
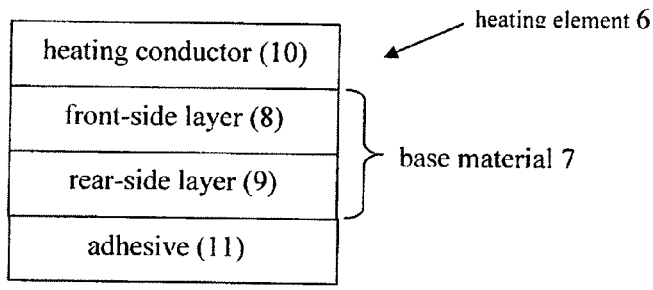
FIG. 4 is a representational diagram of the structure of the heating element according to the invention.

The structure of the steering-wheel rim is illustrated in two implementation variants in FIGS. 2 and 3 while the deformable heating element 6 according to the invention shown in FIG. 4.

The heating element 6, as is schematically shown in FIG. 4, comprises a base material 7 which is divided into a front-side layer 8 and a rear-side layer 9. A heating conductor 10 is placed on the front-side layer 8.

The front-side layer 8 and the rear-side layer 9 differ in their respective compression hardness and/or volume density. The rear-side layer 9 has a compression hardness and/or volume density that is higher than that of the front-side layer 8. Owing to the low compression hardness and/or volume density of the front-side layer 8 it is ensured that the heating conductor 10 fits into the layer, normally a fiber layer, at the very moment when the heating element 6 is installed, e.g. as a steering wheel heater into a steering wheel, as is shown in two variants in the schematic illustrations of FIGS. 2 and 3.

The rear-side layer 9 forms a stable base owing to its higher compression hardness and/or volume density. Depending on whether the heating element is to be arranged close to the cover or at a greater distance from the cover, the heating element 6, as is shown in FIG. 4, is placed with the base material 7 and the heating conductor, which is laid or embedded on the front-side layer 8, on the steering wheel rim 3 in a corresponding orientation.

FIG. 2 shows an embodiment in which the heating conductor 10 is positioned directly underneath the cover 5 of the steering wheel rim 3. The cover 5 is thus glued to the heating element 6, which means to the front-side layer 8 of the base material 7, by means of adhesive 12. The rear-side layer 9 of the base material 7 is glued to the steering wheel body 3 by means of adhesive 11.

The rear-side layer 9 with which the adhesive is in contact ensures on account of the low compression hardness or volume density that the adhesive 11 penetrates into said rear-side layer 9 only to a small degree. As a result, the base material 7 is not substantially strengthened by adhesive.

The heating conductor 10 can be placed on the front-side layer 8 of the base material 7 and can additionally be fastened by suitable fastening means.

Preferably, the heating conductor consists of a plurality of strands, so that it can be laid on the base material 7 in an appropriate pattern and moreover fits into the material of the front-side layer 8. The insertion of the heating conductor 10 into the material of the front-side layer 8 in such a manner that the heating conductor 10 cannot be seen on the cover applied thereto is specifically backed up when the material of the front-side layer 8 is loosened very much. In the case of a fiber material from which the front-side layer 8 is preferably formed, the fibers are loosened such that a part of the fibers is laid around the heating conductor 10 or even covers the same.

The cover 5, which is covering the heating element 6, is fastened by an adhesive 12 which is preferably applied to the adhesive area of the cover 5 before the cover 5 is placed on the heating element 6. Said adhesive 12 will only penetrate into the base material 7 and the front-side layer 8, respectively, if the cover 5 is pressed against the heating element 6.

FIG. 3 shows an implementation variant in which the heating element 6 has been turned by comparison with the embodiment of FIG. 2, so that the front-side layer 8 of the base material 7, on which the heating conductor 10 is placed or embedded, is now oriented towards the steering wheel body 3. As a consequence, the heating conductor 10 is not directly positioned underneath the cover 5.

The heating element 6 with the base material 7 and the heating conductor 10 placed thereon can already be provided with a layer of adhesive 11, so that the adhesive 11 need not be applied separately onto the steering wheel body 3. This particularly offers manufacturing advantages as well as structural advantages.

Owing to the use of a liquid adhesive 12, which is applied to the front-side layer 8 of the base material 7, a composite material is formed that in addition to the fastening of the cover 5 has the characteristic that it makes sure all the time that the heating wire 10 cannot be seen on the surface of the cover 5 even after prolonged use.

Various adhesives can be used, particularly liquid adhesives based on highly volatile solvents; water-based adhesives should be preferred.

When the composite material is formed by using a thermally curable or UV-curable adhesive, a further layer with adhesive 12 will nevertheless be applied. Said adhesive 12 can be applied prior to the placement of the cover to the deformable heating element already mounted on the steering wheel body, and/or to the cover.

There has thus been shown and described a novel deformable heating element which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A deformable heating element for a vehicle steering wheel, adapted to be attached to a steering wheel body by means of an adhesive, said heating element comprising a base material, having a rear-side layer and a front-side layer both formed of a flat fibrous material, and at least one heating conductor, one side of which is laid on, and fastened to, the front-side layer of the base material, the improvement wherein the front-side layer of the base material, on which the heating conductor is laid and fastened, has at least one of a lower compression hardness and a volume density than does this base material in the area of the opposite, rear-side layer thereof and occupies a volume that is in the range of 50% to 100% greater, at the same volume weight, as the rear-side layer, and wherein the heating conductor is embedded in the fibrous material on the front-side layer such that fibers thereof are laid around the heating conductor and at least partially cover the same.

2. The deformable heating element according to claim 1, wherein the entire base material is made of one type of fibrous material.

3. The deformable heating element according to claim 1, wherein the base material has a volume weight ranging from 50 kg/m$^3$ to 200 kg/m$^3$.

4. The deformable heating element according to claim 1, wherein the base material has a volume weight ranging from 50 kg/m$^3$ to 100 kg/m$^3$.

5. The deformable heating element according to claim 1, wherein the base material is made from a material layer having a basis weight of from 50 g/m$^2$ to 150 g/m$^2$ at a thickness of 1-2 am.

6. The deformable heating element according to claim 1, wherein the base material is made from a needle-punched nonwoven, at least on the front-side layer.

7. The deformable heating element according to claim 1, wherein the base material is made from cellulose wadding, at least on the front-side layer.

8. The deformable heating element according to claim 1, wherein the base material is made from a material with elastic fibers.

9. The deformable heating element according to claim 1, wherein the front-side layer and the rear-side layer of the base material are made from at least two superimposed mats.

10. The deformable heating element according to claim 1, wherein the rear-side layer of the base material is made from a knitted fabric.

11. The deformable heating element according to claim 1, wherein the compression hardness of the base material increases monotonically from the front side to the rear side thereof.

12. The deformable heating element according to claim 1, wherein the compression hardness of the base material increases linearly from the front side to the rear side thereof.

13. The deformable heating element according to claim 1, wherein the compression hardness of the base material increases quadratically from the front side to the rear side thereof.

14. The deformable heating element according to claim 1, wherein the heating conductor consists of filaments, the individual filaments of which are each coated with at least one coat of lacquer.

15. The deformable heating element according to claim 1, wherein an adhesive is applied to the front-side layer of the base material.

16. The deformable heating element according to claim 1, wherein an adhesive is applied to the rear-side layer of the base material.

* * * * *